United States Patent [19]

Frye et al.

[11] Patent Number: 5,067,765
[45] Date of Patent: Nov. 26, 1991

[54] FLEXIBLE SUN VISOR WITH OVER-CENTER SPRING

[75] Inventors: Dale J. Frye; Michael J. Suman, both of Holland, Mich.

[73] Assignee: Prince Corporation, Holland, Mich.

[21] Appl. No.: 383,543

[22] Filed: Jul. 24, 1989

[51] Int. Cl.⁵ ................................................ B60J 3/00
[52] U.S. Cl. .................................. 296/97.8; 296/97.4; 296/97.9
[58] Field of Search ................ 296/97.1, 97.4, 97.8, 296/97.9; 160/DIG. 3, 88, 132, 354, 370.2

[56] References Cited

U.S. PATENT DOCUMENTS

| | | | |
|---|---|---|---|
| 1,500,563 | 7/1924 | Howell | 296/97.8 |
| 1,603,181 | 10/1926 | Aborn | 160/88 |
| 1,621,972 | 3/1927 | Darby | 160/370.2 X |
| 1,640,660 | 8/1927 | Johnson | 160/88 X |
| 1,970,886 | 8/1934 | Dowd | 160/132 |
| 2,506,383 | 5/1950 | Powers | 160/132 |
| 3,003,812 | 10/1961 | Haugland | 296/97.7 |
| 3,069,198 | 12/1962 | Winn | 160/88 X |
| 4,468,062 | 8/1984 | Marcus et al. | 296/97.8 |
| 4,736,980 | 4/1988 | Eubanks | 160/370.2 X |
| 4,775,180 | 10/1988 | Phillips | 160/370.2 X |
| 4,792,176 | 12/1988 | Karford | 296/97.8 |
| 4,815,784 | 3/1989 | Zheng | 296/97.8 X |
| 4,824,160 | 4/1989 | Fleming | 296/97.4 |

Primary Examiner—Johnny D. Cherry
Assistant Examiner—Andrew C. Pike
Attorney, Agent, or Firm—Price, Heneveld, Cooper, DeWitt & Litton

[57] ABSTRACT

A flexible sun shading membrane has an edge coupled to a window frame and an opposite edge attached to a moveable member which has at least two stable positions, one being closed adjacent and conforming to the window frame and a second position extended and lowered from the window frame to stretch the membrane into a sun blocking position.

22 Claims, 2 Drawing Sheets

FLEXIBLE SUN VISOR WITH OVER-CENTER SPRING

BACKGROUND OF THE INVENTION

The present invention pertains to vehicle visors and particularly a vehicle visor which employs an over-center bias mechanism for holding the visor in stored and use positions respectively.

In modern vehicles where the interior space is somewhat smaller than in earlier vehicles and more streamlined in configuration, storage of visors and particularly visors, for use with side windows is becoming an increasingly difficult design problem to conquer. Side window visor systems have been designed to provide slide-out storage of visors particularly ones which are incorporated into the headliner of a vehicle. U.S. Pat. Nos. 4,824,160 and 4,468,062 provide side window visors which provide integral storage within the vehicle headliner. Although such visors provide a compact neat appearing system, they require a mechanism for very smooth operation either manually or automatically, the construction of which increases the cost of manufacturing. Also, such visors preferably must be in a stored position to allow free access through the vehicle doorway.

SUMMARY OF THE PRESENT INVENTION

The system of the present invention provides a visor for a vehicle which is relatively uncomplicated in construction and yet provides an efficient compactly stored and efficiently operated visor which can be added to a vehicle at a relatively low cost. The visor is particularly well suited for use in a side window application and can be supplied either as original equipment to a vehicle or as an add-on aftermarket item. These desirable qualities of the visor are achieved in the preferred embodiment of the invention by employing a flexible or collapsible sun shading membrane which can be collapsed in a stored position adjacent a window frame and which has an edge opposite its coupling to the window frame attached to a moveable member which has at least two stable positions, one being closed adjacent and conforming to the window frame and a second position extended and lowered from the window frame to stretch the membrane into a sun blocking position. In the preferred embodiment of the invention, the moveable member is made of resilient polymeric material which is flexible and serves as an over-center spring with snap action movement between a stored position in which the sun shade material is collapsed and adjacent the vehicle window and an extended position in which the material is expanded into a use position for sun blocking. The sun shade membrane is a stretch fabric in one embodiment. In another embodiment of the invention, the moveable member can be two or more rigid members pivotally coupled by a suitable over-center spring mechanism to provide the desired motion and control of the membrane.

Such construction allows the incorporation of a relatively inexpensive visor to a vehicle window utilizing a minimum number of parts and provides for compact and streamlined storage in a very small area. These and other features, objects and advantages of the present invention can best be understood by reference to the accompanying drawings in which:

DETAILED DESCRIPTION OF THE PREFERRED EMBODIMENTS

Figure 1:
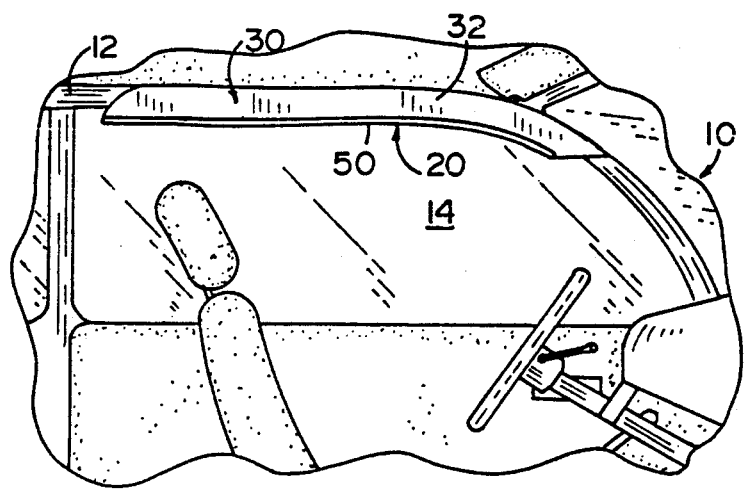
FIG. 1 is a fragmentary perspective view of a vehicle incorporating a visor embodying the present invention with the visor shown in a stored position.
Figure 2:
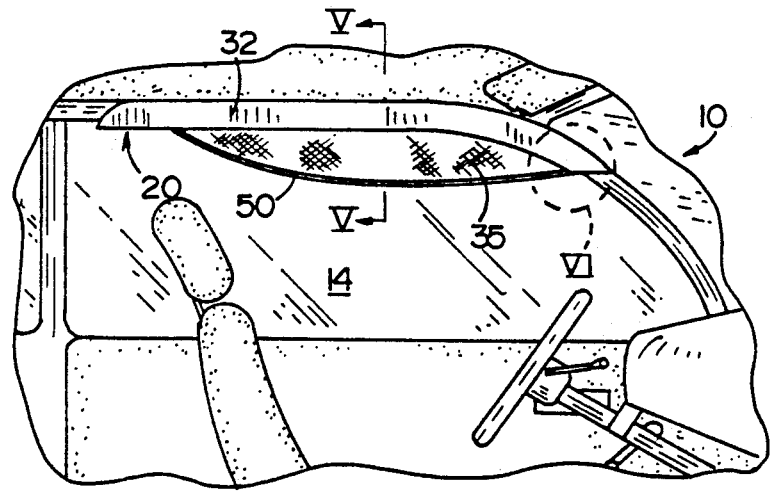
FIG. 2 is a fragmentary perspective view of the structure shown in FIG. 1 shown with the visor in a lowered use position.
Figure 3:
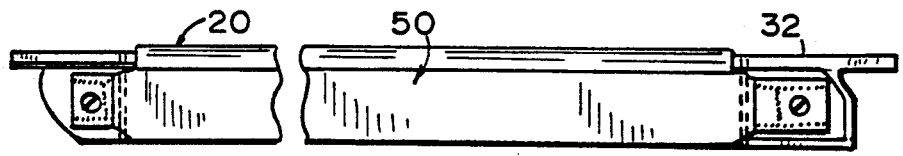
FIG. 3 is a bottom plan view of a visor embodying the present invention.
Figure 4:
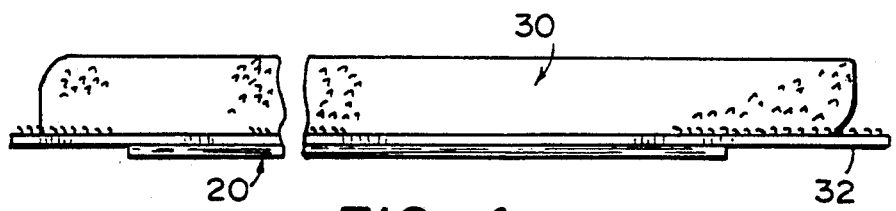
FIG. 4 is a top plan view of the visor shown in FIG. 3.

Referring initially to FIGS. 1 and 2 there is shown a vehicle 10 incorporating a visor assembly 20 embodying the present invention.

Figure 5:
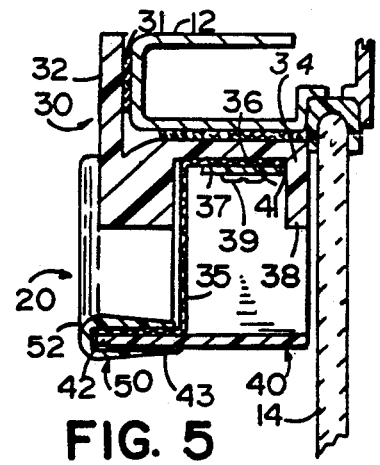
FIG. 5 is an enlarged fragmentary cross-sectional view of the visor of the present invention taken along section lines V—V of FIG. 2.

In the embodiment shown, visor 20 is mounted to the door frame 12 along the top edge of the side window 14 of the vehicle, although it is to be understood that the visor assembly of the present invention can be used at other locations in the vehicle. With the vehicle construction shown, the visor moves with the door and therefore can remain in a lowered position for blocking sunlight at the upper area of the window when the door is opened allowing unhampered ingress and egress into and from the vehicle respectively. In the embodiment shown in FIGS. 1-6, the visor assembly 20 includes a mounting frame 30 to which there is pivotally attached a moveable over-center member 40 between which there is mounted a sun blocking membrane or body 35 which can collapse into a position stored within frame 30 as shown in FIG. 1 or extended to a lowered use position for providing a sun blocking function as shown in FIGS. 2 and 5. The moveable member 40 is in compression between the pivot mounts at opposite ends of frame 30 such that it has two stable positions, one being a stored position as shown in FIG. 1 and the second being a use position shown in FIG. 2. Having briefly described the major elements of the visor system of the present invention, a detailed description of the embodiment shown in FIGS. 1-6 now follows.

Initially it is noted that frame or mounting bracket 30 is supplied, in the embodiment shown in FIGS. 1-6, such that visor 20 can be added to an existing vehicle. When the visor system of the present invention is integrated as original equipment of a vehicle during its manufacturing, structure similar to bracket 30 will be integrally incorporated within door frame 12 and thus will be unnecessary as a separate element. In the embodiment shown, however, frame 30 includes an outer upwardly extending wall 32 (FIG. 5) which terminates in a horizontally extending flange 34 which, as best seen in FIG. 5, surround two sides of the metallic door frame 12. In order to attach frame 30 to the vehicle, in the embodiment shown, VELCRO material 31 is employed between the door frame 12 and the inner surfaces o members 32 and 34 of frame 30. Other fastening means could also be employed such as an adhesive, screws, or the like. The loop and hook material, however, allows easy installation and removability of the visor without externally exposed fastening means.

Frame 30 also includes a downwardly depending channel 36 defined in part by wall 32 and an outer wall 38, as best seen in FIG. 5. Channel 36 serves to receive and store the collapsible sun screening membrane 35 when in a stored position as seen in FIG. 1.

Membrane 35 is preferably a collapsible material such as a fabric and in the preferred embodiment is a two way stretch fabric such as LYCRA was employed. The upper end of the material was secured to frame 30 by means of an elongated rectangular backing plate 37 extending along the floor of horizontal support member 34 and secured thereto at spaced locations by fastening means such as screws 39, with the upper end 41 of fabric 35 compressibly clamped between members 37 and 34 as best seen in FIG. 5. The opposite end of fabric 35 is compressibly held to the elongated rectangular moveable member 40 by means of a flexible molding 50 which compressibly clamps the end 43 of fabric 35 around the outer edge 42 of member 40 as best seen in FIG. 5. Molding 50 serves a dual function, namely to compressibly mount the fabric to member 40 as well as operating as a control handle for operator use of the visor 20.

Figure 6:
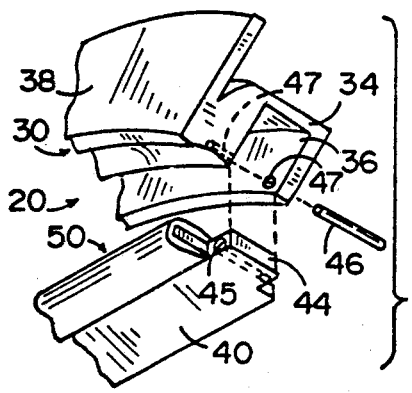
FIG. 6 is a fragmentary end perspective view of the visor embodying the present invention taken generally in the direction shown by arrow VI in FIG. 2.

Moveable member 40 is preferably a flexible member made of a resilient polymeric material such as A.B.S. and is pivotally mounted at its opposite ends to frame 30, as best seen in FIG. 6, by means of a narrowed flange 44 which includes an aperture 45 extending therein for receiving a pivot pin 46 extending through apertures 47 in frame 30. Pivot pin 46 may be a roll pin or otherwise a pin which can be forced fitted and permanently secured to frame 30 thereby pivotally mounting each of the opposite ends of member 40 to opposite ends of frame 30. Only one of the interconnections is shown in FIG. 6, it being understood that the opposite end has a similar pivot connection between member 40 and frame 30. Fabric 35 can be pre-cut in the desired shape such as shown in FIG. 2 in the lowered position and can have curvilinear edges to conform to a particular application such as shown in its extended position in FIG. 2. In FIGS. 2 and 5 the fabric is substantially stretched to present a smooth wrinkle free appearance. The utilization of a stretch fabric facilitates this construction and the fabric can be chosen to be of a color which conforms to the vehicle interior or some other desirable color and degree of light transmissivity for an individual application.

In the embodiment shown in FIGS. 1-6 the visor is operated by pulling downwardly on the outer rounded edge 52 of molding 50 until the flexible member 40 pivots away from its first stable position shown in FIG. 1, past its center position to an over-center second stable position shown in FIG. 2. The member 40 is placed in slight compression between pivot pins 46 at opposite ends of frame 30 to assure the member will have two stable states corresponding to the stored and use positions, thus the member acts as an over-center spring providing snap-up and snap-down control of the collapsible visor. Instead of employing the flexible resilient polymeric material 40, the over-center spring action can be achieved utilizing one or more rigid members such as now described in connection with the remaining drawings FIGS. 7-9.

Figure 7:
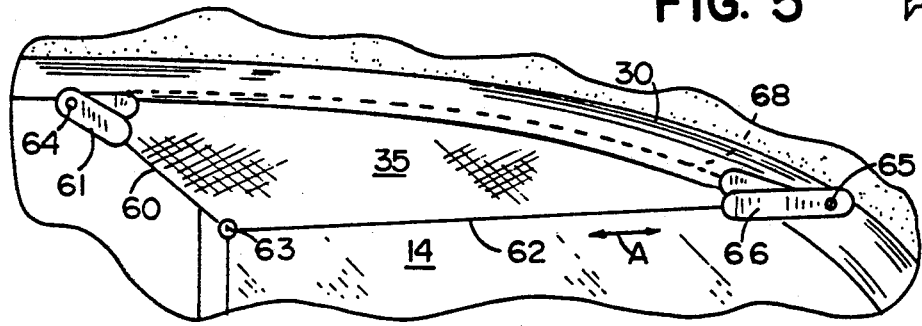
FIG. 7 is a schematic elevational view of an alternative embodiment of the present invention.
Figure 8:
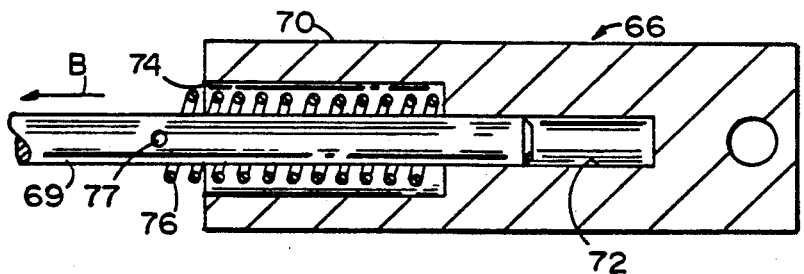
FIG. 8 is an enlarged fragmentary cross-sectional view of one of the pivot mounting members shown taken along section line VIII—VIII of FIG. 7.

In FIG. 7, which is a schematic diagram of an alternative embodiment of the present invention, flexible fabric or body 35 is employed as in the first embodiment. However, in place of flexible member 40, a pair of rigid support members 60 and 62 are pivotally joined at pivot connection 63 to provide the lower guide and support for the fabric 35 which is attached at its upper end in the same manner as taught in FIGS. 1-6. Member 60 is attached to frame 30 by a conventional pivot connection 61 including a pivot pin 64. Member 62 however, has its end connected to frame 30 by means of a spring-loaded pivot connection 66 and pivot pin 65, which is shown in greater detail in FIG. 8, to provide over-center biasing and movement of rigid member 62 in a direction indicated by arrow A in FIG. 7 to allow over-center spring action of the two rigid members 60 and 62 between the lowered use position shown in FIG. 7 and a raised stored position shown by line 68 in FIG. 7. In the lowered use position, the visor blocks sunlight at the upper area of the window.

Pivot connection 66 includes a mounting block 70 having a stepped blind cylindrical bore 72 and 74 formed therein for receiving the end 69 of member 62 therein. The bore section 72 slideably receives the end of rod-shaped member 62 while section 74 accommodates a compression bias spring 76 coaxially fitted over end 69 for urging arm 62 outwardly in a direction indicated by arrow B by contacting a cross pin 77. Spring 76 provides sufficient force to toggle the arms 60 and 62 between the two stable positions and to tension the fabric 35 to a smoothly stretched condition when in a lowered use position and yet allow the easy movement of members 60 and 62 to the raised stored position. The visor is raised to the stored position by pushing upwardly against member 62 or a handle (not shown) provided thereon. Member 60 pivots at pivot point 64 while member 62 pivots at pivot point 65 and initially travels in a direction opposite of arrow B further into aperture 72 formed in block 70 as members 60 and 62 pass their in-line position in which they are longitudinally aligned with one another. As the members move towards their over-center position, spring 76 urges member 62 outwardly so that the members 60 and 62 are then forced upwardly into the stored position illustrated by line 68 in FIG. 7. Thus, members 60 and 62 together with bias means 76 act as an over-center spring mechanism to provide stable stored and use positions for the visor.

Figure 9:
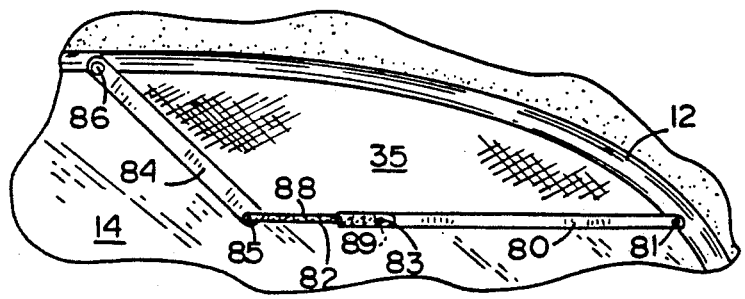
FIG. 9 is a schematic view of yet another embodiment of the present invention.

In yet another alternative embodiment illustrated in FIG. 9, a three member moveable support mechanism is illustrated in which the fabric material 35 is mounted to a first rigid pivot rod 80, a second spring-loaded collapsible pivot rod 82 and a third rigid pivot rod 84. Rod 80 is pivotally mounted at 81 to door frame 12 and to collapsible pivot member 82 by pivot connection 83. The end of collapsible member 82 is coupled to member 84 by pivot connection 85 while the opposite end of member 84 is pivotally coupled to door frame 12 by pivot connection 86. Member 82 can be a suitable collapsible member such as a pair of telescopic members 87 and 88 between which there is provided an internal spring 89 tending to urge the members 87 and 88 away from each other and toward pivot points 83 and 85. As can be appreciated, with this construction as the members 82 and 84 move from the stable lowered position shown in FIG. 9 to a raised stored position adjacent and in general alignment with frame 12, member 82 collapses slightly as the members pass their longitudinally aligned position, and then expands to maintain the stable stored position adjacent the door frame 12.

Thus, in all the embodiments, a membrane such as a fabric 35 is coupled at one end to a fixed vehicle member adjacent the vehicle window while the lower moveable end of the material is coupled to an over-center spring mechanism which has at least two stable states, one being in a raised stored position adjacent the vehicle window and the second a lowered use position stretching the fabric to an expanded use position. It will become apparent to those skilled in the art that various modifications to the preferred embodiments of the invention as described herein can be made without departing from the spirit or scope thereof as defined by the appended claims.

The embodiments of the invention in which an exclusive property or privilege is claimed are defined as follows.

1. A visor for a vehicle comprising:
a membrane forming a visor and having a first end secured to the vehicle adjacent a window;
a frame associated with said vehicle window at least at one side thereof; and
a moveable member including over-center means, said moveable member attached to said membrane at an end of said membrane opposite said first end, said moveable member moveable between at least two stable positions with the first stable position in which said membrane is collapsed in a stored position adjacent said one side of the window and the second stable position spaced from said first stable position and in which said membrane is extended to a lowered use position for at least partially blocking sunlight entering the window.

2. The apparatus as defined in claim 1 wherein said over-center means is flexible and said moveable member is pivotally mounted at opposite ends to said frame to be in compression such that said moveable member can assume said two stable positions.

3. The apparatus as defined in claim 1 wherein said membrane is a fabric.

4. The apparatus as defined in claim 3 wherein said over-center means comprises an over-center spring.

5. The apparatus as defined in claim 4 wherein said over-center means is flexible and said moveable member is pivotally mounted at opposite ends to said frame to be in compression such that said moveable member can assume said two stable positions.

6. The apparatus as defined in claim 1 wherein said membrane is a stretchable fabric.

7. A visor for a vehicle comprising:
a membrane forming a visor and having a first end secured to the vehicle adjacent a window;
a frame associated with said vehicle window at least at one side thereof; and
a moveable member comprising an over-center spring, said moveable member attached to said membrane at an end of said membrane opposite said first end, said moveable member moveable between at least two stable positions with the first stable position in which said membrane is collapsed in a stored position adjacent said one side of the window and the second stable position spaced from said first stable position and in which said membrane is extended to a lowered use position for at least partially blocking sunlight entering the window.

8. A visor for a vehicle comprising:
a membrane forming a visor and having a first end secured to the vehicle adjacent a window;
a frame associated with said vehicle window at least at one side thereof; and
a moveable member attached to said membrane at an end of said membrane opposite said first end, said moveable member moveable between at least two stable positions with the first stable position in which said membrane is collapsed in a stored position adjacent said side of the window and the second stable position spaced from said first stable position and in which said membrane is extended to a lowered use position for at least partially blocking sunlight entering the window; said moveable member comprising at least a pair of arms pivotally coupled to each other and with at least one of said arms including a spring biased portion for allowing collapsing of said one arm to toggle said moveable member between said first and second stable positions.

9. The apparatus as defined in claim 8 wherein said one arm comprises a spring-loaded telescopic arm.

10. The apparatus as defined in claim 8 wherein said membrane is a fabric.

11. A visor for a vehicle comprising:
a visor body having a first end coupled to the vehicle adjacent a window; and
an over-center spring member attached to said visor body at an end of said membrane opposite said first end, said over-center spring member moveable between at least two stable positions with the first stable position in which said visor body is in a stored position adjacent the window and the second stable position spaced from said first stable position and in which said visor body is extended to a use position for at least partially blocking sunlight at an upper area of the window.

12. The apparatus as defined in claim 11 wherein said visor body is made of a collapsible material.

13. The apparatus as defined in claim 12 wherein said collapsible material is a fabric.

14. The apparatus as defined in claim 13 wherein said fabric is a stretchable fabric.

15. The apparatus as defined in claim 14 wherein said over-center spring member is a flexible member pivotally mounted at opposite ends to the vehicle window frame to be in compression such that it can assume said two stable positions.

16. The apparatus as defined in claim 14 wherein said over-center spring member comprises at least a pair of arms pivotally coupled to each other and with at least one of said arms including a spring biased portion for allowing collapsing of said one arm to toggle said over-center spring member between said first and second stable positions.

17. A visor for a vehicle having a window with a top edge, said visor comprising:
a collapsible material forming a visor and having a first end secured to the vehicle along and adjacent the top edge of the window; and
a moveable over-center member attached to said collapsible material at an end of said membrane opposite said first end, said moveable member moveable between at least two stable positions with the first stable position in which said collapsible material is collapsed in a stored position along the top edge of the window and the second stable position spaced from said first stable position and in which said collapsible material is extended to a lowered use position for at least partially blocking sunlight at an upper area of the window.

18. The apparatus as defined in claim 17 wherein said collapsible material is a fabric.

19. A visor for a vehicle having a window with a top edge comprising:
a collapsible fabric material forming a visor and having a first end secured to the vehicle along the top edge and adjacent the window; and
a moveable member including an over-center spring mechanism, said moveable member attached to said collapsible material at an end of said membrane opposite said first end, said moveable member moveable between at least first and second stable positions, said first stable position being a position in which said collapsible material is collapsed in a stored position along the top edge of the window and said second stable position being a position spaced from said first stable position and in which said collapsible material is extended to a lowered use position for at least partially blocking sunlight at an upper area of the window.

20. A visor comprising:
a membrane forming a visor and having a first end coupled to a first support member; and
a moveable member including over-center means; said moveable member coupled to said membrane at an end of said membrane opposite said first end, said moveable member moveable between at least first and second stable positions, said first stable position being a position in which said membrane is collapsed in a stored position adjacent said first support member and said second stable position being a position spaced from said first stable position in which said membrane is extended to a lowered use position for at least partially blocking sunlight entering a window.

21. The apparatus as defined in claim 20 wherein said over-center means is flexible and said moveable member is pivotally mounted at opposite ends to said frame to be in compression such that said moveable member can assume said two stable positions.

22. The apparatus as defined in claim 20 wherein said moveable member comprises at least a pair of arms pivotally coupled to each other and with at least one of said arms including a spring biased portion for allowing collapsing of said one arm to toggle said moveable member between said first and second stable positions.

* * * * *